(No Model.)
F. W. HOOD.
DEVICE FOR REGULATING THE THROW OF WATER METER PISTONS.
No. 316,038. Patented Apr. 21, 1885.
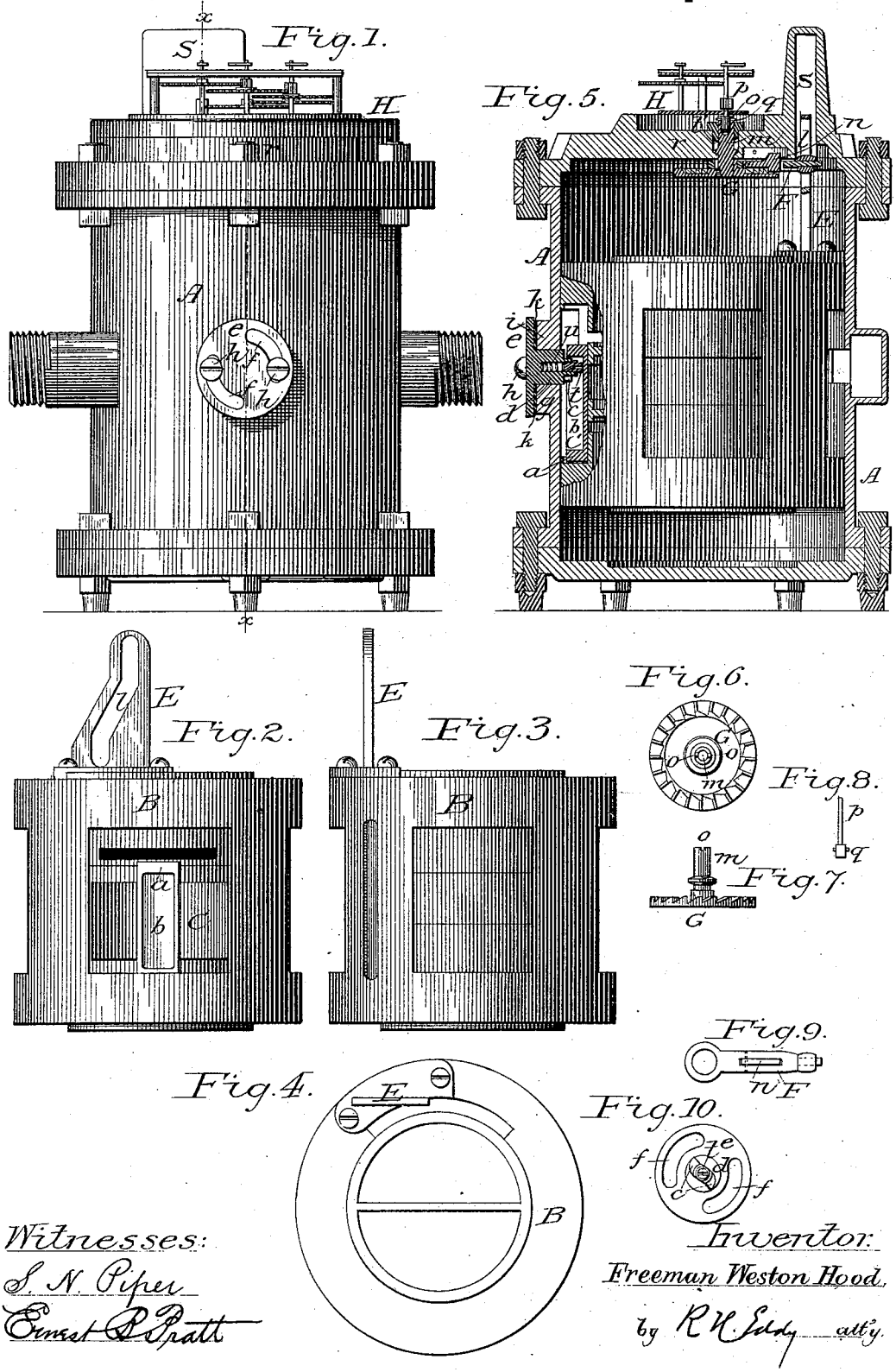
Witnesses:
S. N. Piper
Ernest R. Pratt
Inventor:
Freeman Weston Hood,
by R. H. Eddy atty.

United States Patent Office.

FREEMAN WESTON HOOD, OF BOSTON, MASSACHUSETTS.

DEVICE FOR REGULATING THE THROW OF WATER-METER PISTONS.

SPECIFICATION forming part of Letters Patent No. 316,038, dated April 21, 1885.

Application filed December 17, 1884. (No model.)

*To all whom it may concern:*

Be it known that I, FREEMAN WESTON HOOD, of Boston, in the county of Suffolk, of the Commonwealth of Massachusetts, have invented a new and useful Improvement in Devices for Regulating the Throw of the Piston of a Water-Meter; and I do hereby declare the same to be described in the following specification and represented in the accompanying drawings, of which—

Figure 1 is a side elevation of a meter provided with my invention, the nature of which is defined in the claims hereinafter presented. Fig. 2 is a front elevation, Fig. 3 a side view, and Fig. 4 a top view, of the main piston, its auxiliary valve, and obliquely-slotted standard, to be described. Fig. 5 is a vertical section of the water-meter on line $x\ x$ of Fig. 1, the main piston being shown in elevation, with the exception of a portion of it, which is broken away to show the auxiliary valve and its seat. Fig. 6 is a top view, and Fig. 7 a side view, of the ratchet-wheel and its arbor for engaging with the primary arbor of the register. Fig. 8 is a side view of such primary arbor. Fig. 9 is a top view of the operative arm of the ratchet-wheel. Fig. 10 is an inner end view of the spindle $d$, its duplex cam $c$, and slotted disk $e$, hereinafter described.

My invention relates, specially, to the water-meter described in No. 9,379 of reissues of United States patents, such reissue being dated September 14, 1880, and granted to Francis A. Osborn, trustee, the original patent, No. 101,059, dated March 22, 1870, having been granted to Thomas Sweeney.

In the drawings, A denotes the meter case or shell, and B the main piston, to move rectilinearly within such case. The auxiliary or concave valve of such piston is shown at C as applied thereto in the ordinary way, except that it is not provided, as represented in such reissue patent, with any rod to extend from it through and slide in the heads of the piston, and being for the purpose of moving the valve first in one and next in the opposite direction by being carried alternately against the heads of the shell or case.

In practice it has been found that leakage is apt to take place through the holes in which the said rod slides, and therefore, to avoid such leakage, I adopt other and different means of operating the valve and regulating the extent of its movement as may be required to cause the meter to correctly indicate the amount of water delivered through it.

The object of the mechanism for varying the throw of the piston is to enable the meter to be adjusted from time to time to deliver during each throw of its piston a given quantity of water, it being difficult to so construct the parts that, on first putting the meter in operation, or afterward, as it may wear in use, to have it deliver at each throw of the piston the desirable quantity.

Although I have herein described devices covered by the claims hereinafter made, I do not herein claim such, especially what thereof constitutes the subject or subjects of the first and second of the claims of an application for a patent filed in the Patent Office by me on May 31, 1884, and having the serial number 133,259, such application being pending at the time of filing that to which the specification appertains. The valve C is provided at its middle with an extension, $a$, in which is a rectangular recess, $b$, within which there extends a duplex cam, formed as shown at $c$ in rear view in Fig. 10.

The device $c$, for convenience termed a "duplex cam," does not in its use perform the functions of a cam, but rather that of a stop, as hereinafter explained. This cam is situated at the inner end of a short spindle, $d$, that extends from a slotted disk, $e$, and turns in a cylindrical hole or bearing, $i$, arranged in the shell at the middle and at one side thereof. The disk has two arcal slots, $f$, made through it concentrically with the axis of the spindle, and such disk rests against the circular face of a cylindrical projection, $g$, extended, as represented, from the shell. Heading-screws $h\ h$ go through the said slots and screw into the projection $g$ and answer to clamp the disk thereto. By turning the disk, so as to revolve the spindle on its axis more or less, the duplex cam will be correspondingly turned within the recess $b$. This cam with the ends of the said recess serve as stops or means to arrest the valve in its reciprocating movements and to determine the extent of each of such movements, each being increased as the obliquity of the cam to the recess is increased, and diminished as such obliquity is diminished by turning the disk. Leakage through the hole $i$ is easily prevented by a washer, $k$, encompassing the spindle between the disk $e$ and the projection $g$, toward which latter the disk is to be forced by the screws $h$. The spindle $d$ is tubular and has within and projecting from its bore a slide, $t$, and in rear thereof a spiral spring, $u$, against which the slide bears when also bearing against the auxiliary valve. This slide and spring are to allow the said valve to give way or move backward in case of any obstruction getting between it and its seat, and operating to prevent the valve from properly working.

To the upper end or head of the piston B a standard, E, having within it an oblique slot, $l$, is fastened. Into this slot an arm, F, at its outer end enters. This arm turns on the upright spindle $m$ of a ratchet-wheel, G, and carries a pawl, $n$, to engage with such ratchet-wheel. The spindle $m$ goes upward through the upper head, $r$, of the shell or case and turns in a stuffing-box, $t'$, applied thereto. At its upper part the spindle is tubular, while at its upper end it is grooved diametrically, as shown at $o$.

The primary or main arbor $p$ of the register H extends at its foot into the bore of the spindle $m$, and is provided with a pin, $q$, to enter the groove $o$, the said pin going diametrically through the arbor. The groove and pin serve to so engage the arbor and spindle as to cause the former to be revolved with and by the latter in its intermittent rotary movement.

From the above it will be seen that the described mode of applying the said primary arbor to the spindle admits of the two being readily disengaged when it may be desirable to remove the register from the shell, or of being as easily engaged when the register is in the act of being adapted to the shell. The cover or head $r$ of the shell is provided with a water-tight hood or chambered projection, $s$, to extend from it, as shown, and to open through the head and receive the standard E, as the piston may rise to its highest position.

As the piston may move upward and downward within the shell, there will be imparted to the arm F reciprocating movements, whereby its pawl will be made to turn the ratchet-wheel, and thereby produce a corresponding rotary movement of the primary arbor $p$.

I do not herein claim the water-meter described in the said Patent No. 9,379 of reissues of United States patents; but

I claim—

1. The combination of the recessed extension of the auxiliary valve of the piston with the duplex cam and its spindle, and slotted disk, and a set-screw to each of the slots of such disk applied to the shell or case, substantially as represented.

2. The combination of the slide $t$ and spring $u$ with the auxiliary valve C, and with the spindle $d$, provided with the duplex cam and slotted disk, as described.

FREEMAN WESTON HOOD.

Witnesses:
R. H. EDDY,
E. B. PRATT.